US006708757B2

United States Patent
Hebel et al.

(10) Patent No.: US 6,708,757 B2
(45) Date of Patent: Mar. 23, 2004

(54) HEAT SINK MODULE AND AN ARRANGMENT OF HEAT SINK MODULES

(75) Inventors: Rainer Hebel, Heidenheim (DE); Hartmut Michel, Heidenheim (DE)

(73) Assignee: EPCOS AG, München (DE)

( * ) Notice: Subject to any disclaimer, the term of this patent is extended or adjusted under 35 U.S.C. 154(b) by 0 days.

(21) Appl. No.: 10/220,172

(22) PCT Filed: Feb. 14, 2001

(86) PCT No.: PCT/DE01/00557

§ 371 (c)(1),
(2), (4) Date: Aug. 28, 2002

(87) PCT Pub. No.: WO01/65899

PCT Pub. Date: Sep. 7, 2001

(65) Prior Publication Data

US 2003/0047302 A1 Mar. 13, 2003

(30) Foreign Application Priority Data

Feb. 28, 2000 (DE) .......................... 100 09 398

(51) Int. Cl.⁷ ................................. F28F 7/00
(52) U.S. Cl. ................. 165/80.3; 165/185; 165/78; 361/704; 257/722
(58) Field of Search .................. 165/78, 185, 80.3, 165/76; 257/720, 722; 174/16.3; 361/704, 710, 729, 734, 735; 29/890.039

(56) References Cited

U.S. PATENT DOCUMENTS

| 3,081,824 | A | * | 3/1963 | Macall .................. 165/185 |
| 3,220,471 | A | * | 11/1965 | Coe .................... 165/185 |
| 3,312,277 | A | * | 4/1967 | Chitouras et al. ........ 165/185 |
| 3,590,915 | A | * | 7/1971 | Gunter Riedel .......... 165/185 |
| 4,007,402 | A | * | 2/1977 | Allport ................. 361/709 |
| 4,022,272 | A | * | 5/1977 | Miller .................. 165/51 |
| 4,190,879 | A | * | 2/1980 | Tissot .................. 361/720 |
| 4,734,139 | A | * | 3/1988 | Shakun et al. ........... 136/210 |
| 5,168,926 | A | * | 12/1992 | Watson et al. ........... 165/185 |
| 5,373,418 | A | | 12/1994 | Hayasi |
| 5,419,041 | A | * | 5/1995 | Ozeki ................... 165/80.3 |
| 5,486,980 | A | | 1/1996 | Jordan et al. |
| 5,819,407 | A | | 10/1998 | Terada |

FOREIGN PATENT DOCUMENTS

| DE | 003415554 A1 | * | 10/1984 |
| DE | 34 15 554 | | 4/1988 |
| DE | 39 29 701 | | 3/1991 |
| DE | 43 12 927 | | 10/1994 |
| DE | 297 16 405 | | 3/1999 |
| EP | 0 109 557 | | 5/1984 |
| GB | 2 201 042 | | 8/1988 |

OTHER PUBLICATIONS

Abstract of Japanese Published Application 05 275582 (Oct. 22, 1993), *Patent Abstracts of Japan*, vol. 018, No. 049, (E–1497) Jan. 1, 1994.
Abstract of Japanese Published Application 08 29055 (Nov. 5, 1996), *Patent Anstract of Japan*, vol. 1997, No. 03, Mar. 31, 1997.

* cited by examiner

*Primary Examiner*—Tho Duong
(74) *Attorney, Agent, or Firm*—Schiff Hardin LLP

(57) ABSTRACT

A plate-like heat sink module with polygonal ground plan or shape has an upper side for securing a heat generating component and an underside comprises cooling ribs. The outside edges of the module have surface structure complementary with one another and with whose assistance a plurality of the identical heat sink modules can be joined in one plane, whereby the surface structures are fashioned so that a heat sink module can be joined to another heat sink module in only one orientation to form an arrangement of the heat sink modules. As a result of the arrangement of heat sink modules, a heat sink for the interconnection of a plurality of capacitors to form a capacitor bank can be produced in an especially flexible way.

15 Claims, 4 Drawing Sheets

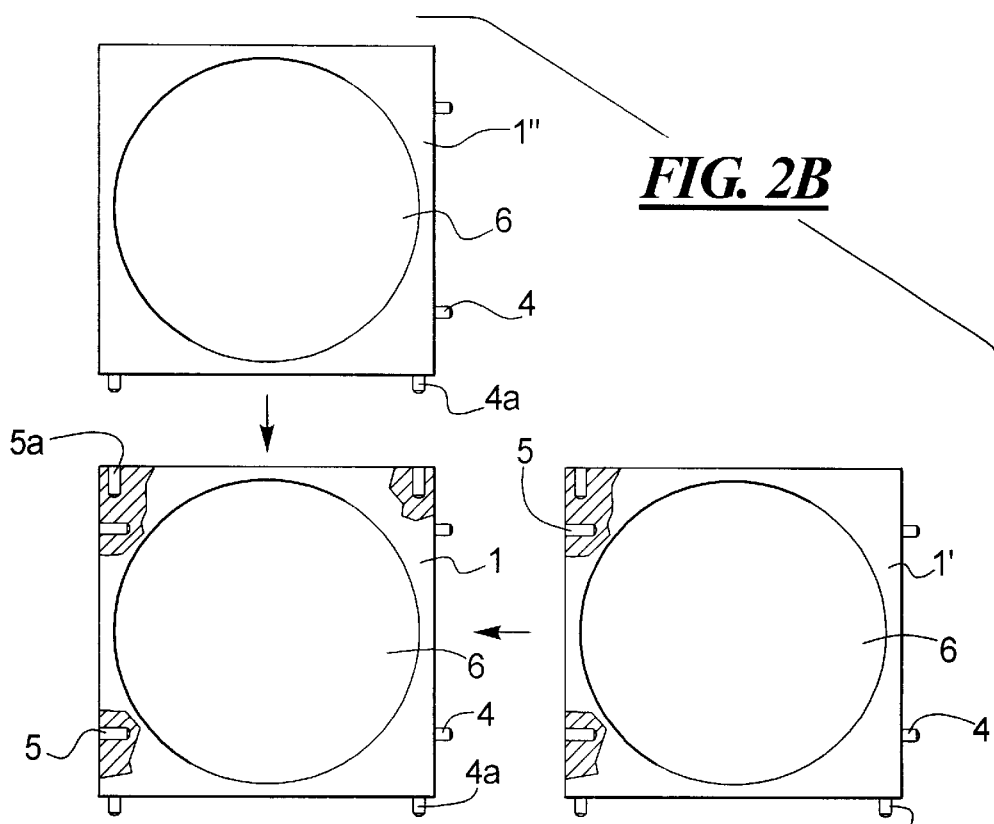
*FIG. 2B*
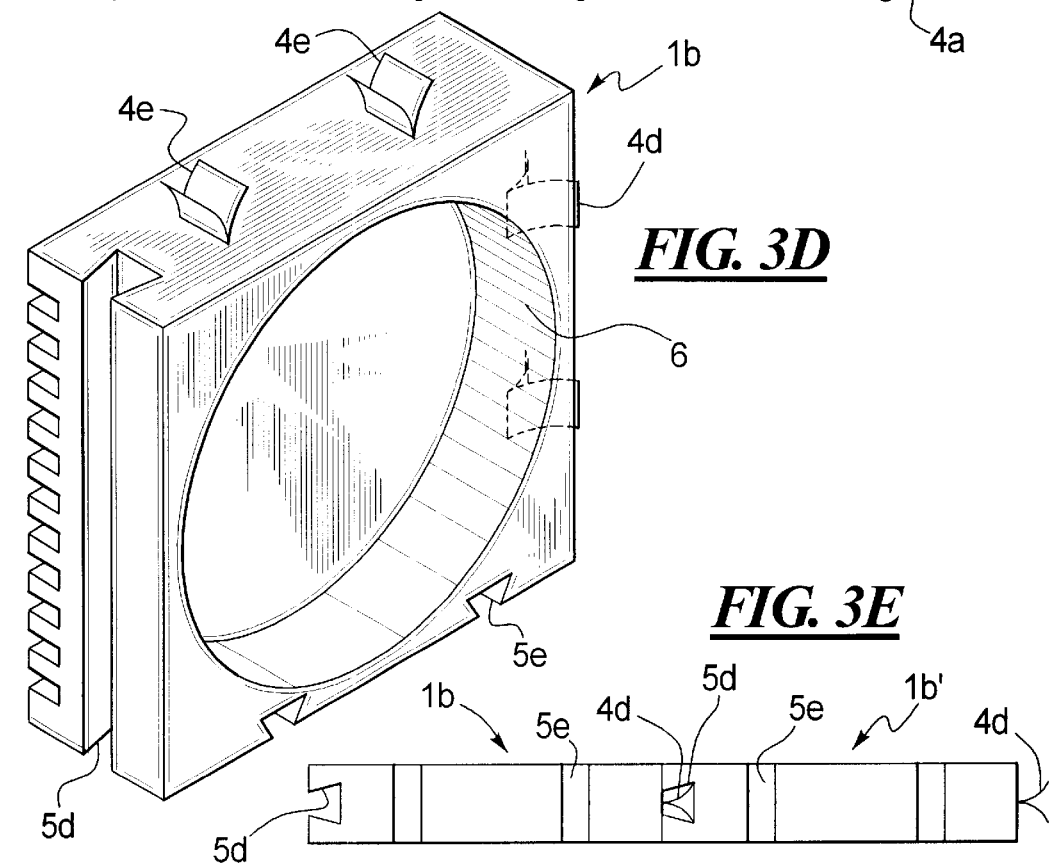
*FIG. 3D*
*FIG. 3E*

HEAT SINK MODULE AND AN ARRANGMENT OF HEAT SINK MODULES

BACKGROUND OF THE INVENTION

The invention is directed to a heat sink module on whose upper side a heat-generating component can be secured and whose underside comprises cooling ribs. The invention is also directed to an arrangement of heat sink modules.

Heat sink modules of the species initially cited are known, and these are utilized as cooling plates for cooling high-power capacitors in frequency converters. A plurality of identical capacitors interconnected to form a capacitor bank are arranged on one of these heat sink modules. These capacitor banks are employed in frequency converters which have different nominal voltages and power classes. Corresponding to these different characteristics of the frequency converters, a different number of capacitors is also required in various arrangements of interconnections, for example in series or parallel or mixed in series and parallel as well. A separate cooling plate with the suitable geometrical dimensions on which the capacitors are then secured is therefore produced for each version of the frequency converter in conformity with the number and interconnection of the capacitors. The known heat sink modules therefore have the disadvantage that they must be separately produced for each type of frequency converter, and this causes a high production outlay.

SUMMARY OF THE INVENTION

It is therefore an object of the present invention to offer a heat sink module that can be employed for cooling different versions of capacitor banks without having to modify the module.

This object is inventively achieved by means of a heat sink module, which has a plate-like member with a polygonal shape with one surface receiving a heat generating article and a second surface having cooling ribs, the module has outer edges with surface structures that are complementary with one another so that a plurality of identical modules can be joined together in one plane and the surface structure is fashioned so the modules are joined together in only one orientation.

The invention specifies a heat sink module that is plate-like and comprises a polygonal ground plan or shape. A heat generating component can be secured on the upper side of the heat sink module. At its underside, the heat sink module comprises cooling ribs that effect an especially efficient cooling of the heat generating component. The outside edges of the heat sink module comprise surface structures that are complementary to one another. For example, these surface structures can be formed by a succession of elevations and depressions. A plurality of identical heat sink modules can be joined in one plane with the assistance of the complementary surface structures. The surface structure of the heat sink modules are fashioned so that a heat sink module can be joined to another heat sink module in only one orientation. An arrangement of the heat sink modules of flexible size and shape can be formed by joining a plurality of the inventive heat sink modules. In addition, the inventive heat sink module has the advantage that a defined orientation of the heat generating component with respect to the heat sink module can be set by means of the fashioning of the surface structure. The orientation is then capable of being transferred onto the arrangement of a plurality of the heat generating components relative to one another as a result of the joining of a plurality of the heat sink modules. This, for example, has the advantage that a plurality of the identically oriented components can be contacted in an especially easy way.

In addition, a heat sink module is especially advantageous that inventively comprises a quadratic ground plan or shape and that can be joined to identical heat sink modules in a checkerboard fashion. Such a heat sink module with quadratic shape or ground plan is very easy to manufacture. Further, a heat sink module with a quadratic shape or ground plan has the advantage that it can be joined in a checkerboard fashion to other heat sink modules as a result whereof an arrangement of the heat sink modules occurs that comprises smooth outside walls and a compact, for example rectangular, outside shape or contour.

The surface structures of the heat sink module can be inventively formed by projections and recesses complementary thereto. For example, the recesses can thereby be realized by blind holes proceeding in the plane and the projections can be realized with round pegs. Such a heat sink module has the advantage that the recesses and projections can be produced relatively simply with standard machine tools. In addition, such a heat sink module has the advantage that it can be plugged to an additional heat sink module, as a result whereof a mechanical strength transverse to the plane derives for the arrangement of heat sink modules formed therefrom.

Another advantageous embodiment of the recesses is in implementing the recesses as channels and the projections as springs fitting into the channels. As a result thereof, it is possible to produce a mechanical contact over the entire length of the outside edge comprising the channel or the spring. An especially high stability of the arrangement of the heat sink modules formed therefrom is obtained.

In addition, it is especially advantageous to inventively implement the projections of the heat sink module as dovetail-like springs. Such dovetail-like springs can be pushed in a direction into a recess mating therewith, as a result whereof a mechanical hold results in all directions proceeding perpendicular to this direction. In particular, the heat sink modules joined in this way can no longer be simply pulled apart, and an improved cohesion results therefrom.

Also, a heat sink module is especially advantageous wherein the upper side thereof comprises a depression that accepts the component. An especially simple, fast and reliable fastening of the component is possible with the assistance of such a depression. It particularly comes into consideration to glue the component in the depression.

When the component comprising an electrically conductive envelope and the heat sink module is also composed of an electrically conductive material, it is especially advantageous to implement the gluing between the component and the heat sink module in an electrically insulating fashion in order to prevent a short between the components.

In addition, a heat sink module is especially advantageous when an electrolytic capacitor is secured to its upper side. Such heat sink modules can, for example, be employed for cooling capacitor banks in frequency converters of different power classes.

The invention also specifies an arrangement of the heat sink modules wherein the same component is secured on each heat sink module, and the components have terminal elements. Each component has its terminal elements aligned identically relative to the surface structure of the respective heat sink. The heat sink modules are joined to one another, forming a continuous plate. Due to the inventive arrangement of the heat sink modules with identical components comprising terminal elements, the orientation of the individual components relative to the heat sink modules that carry them can be transferred onto the capacitor bank formed by the arrangement of identical heat sink modules. This has the advantage that the individual components can be contacted in a very simple and rational way.

In addition, an arrangement of the heat sink modules is especially advantageous wherein the heat sink modules are held together by a frame. Such an arrangement of the heat sink modules has the advantage of an enhanced mechanical stability.

The invention is explained in greater detail below on the basis of exemplary embodiments and the Figures pertaining thereto.

BRIEF DESCRIPTION OF THE DRAWINGS

FIG. 2B shows joining three heat sink modules together;

FIG. 3D shows a perspective view of another embodiment of the heat sink module having dovetail spring arrangements;

FIG. 3E is a side view showing two modules of FIG. 3D being connected together.

DESCRIPTION OF THE PREFERRED EMBODIMENTS

Figure 1:
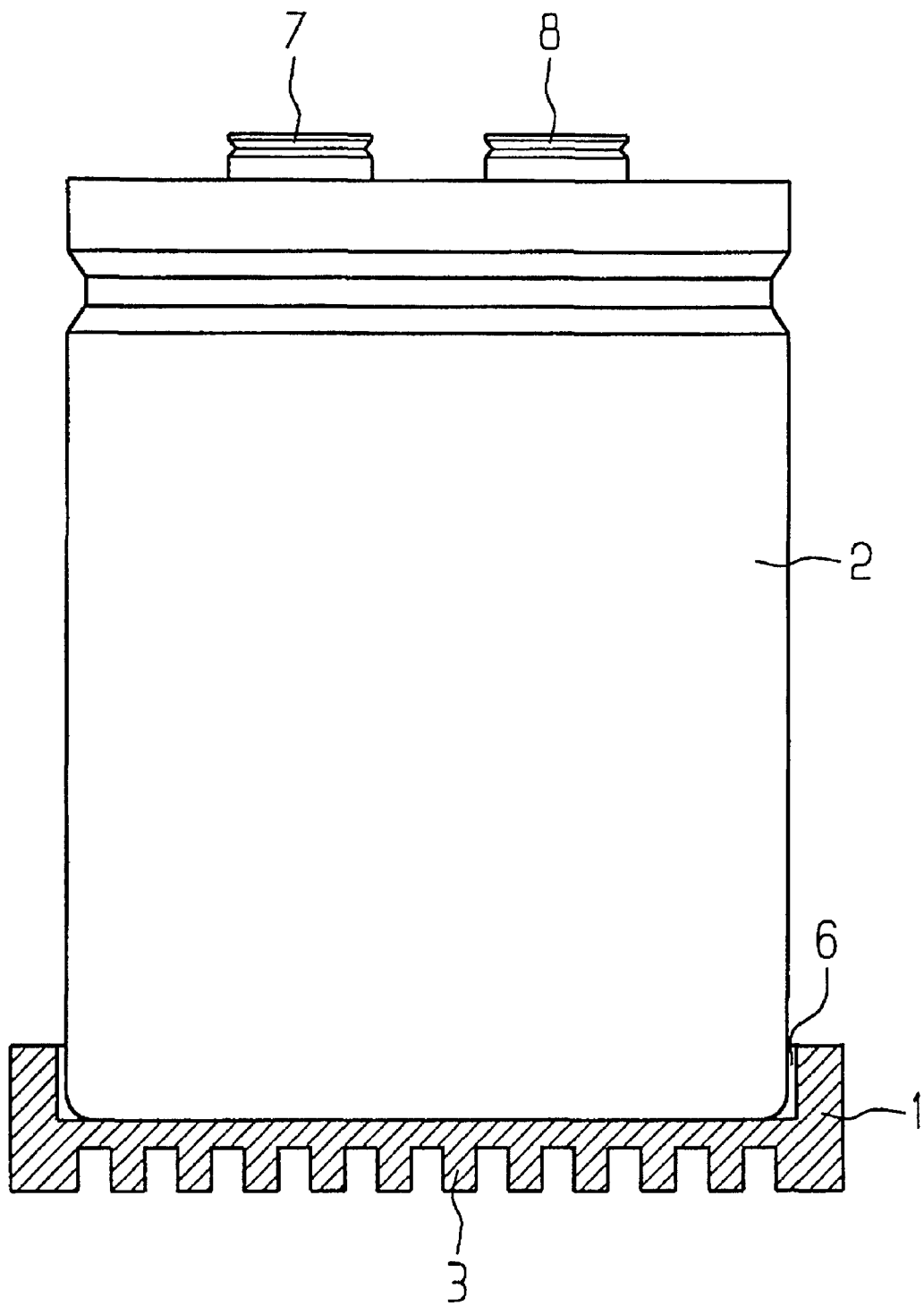
FIG. 1 shows a cross-sectional side view of an inventive heat sink module with an electrolytic capacitor secured thereon.

FIG. 1 shows an inventive heat sink module 1 at whose underside cooling ribs 3 are arranged. A depression 6 in which a component 2 fashioned as an electrolytic capacitor is arranged and located on the upper side of the heat sink module. The component 2 comprises a first terminal element 7 and a second terminal element 8 that represent the cathode or, respectively, the anode given an electrolytic capacitor. The heat sink module 1 is preferably composed of a material that has good thermal conductivity. Metals such as, for example, aluminum or copper particularly come into consideration. The heat sink module 1 can be manufactured by casting or by milling as well. In terms of its lateral dimensions, it corresponds to the dimensions of the component 2 fashioned as an electrolytic capacitor, whereby the capacitances lie between 100 $\mu$F and 10 mF and the capacitor has dimensions of approximately 10–20 mm. Accordingly, the cooling ribs 3 have a spacing of about 2–3 mm from one another. The component 2 can, for example, comprise an outside sheath of metal, particularly aluminum. In electrolytic capacitors, these outside sheaths are usually electrically conductively connected to the cathode, so that it is of critical significance that the component 2 be electrically insulated from the heat sink module 1 in order to prevent a short between a plurality of the components 2. Such an electrical insulation is formed, for example, by a thin plastic layer that can be composed of PVC and is applied on the outside sheath of the component 2. In addition, the underside of the component can be connected to the heat sink module 2 with an electrically insulating adhesive. An adhesive that comprises fillers such as glass or ceramic particularly comes into consideration as an electrically insulating adhesive.

Figure 2A:
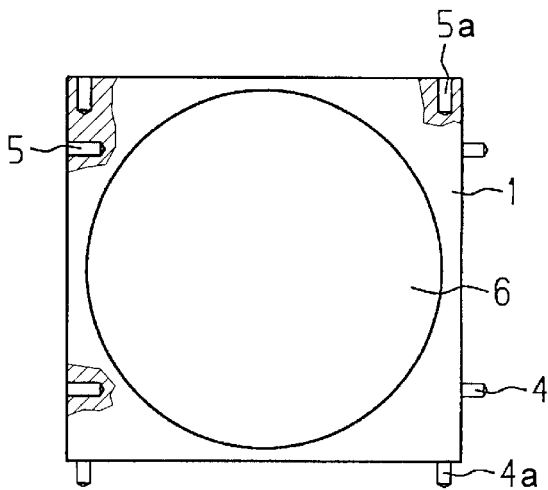
FIG. 2A shows a plan view with portions broken away of an inventive heat sink module that is provided with blind holes and round pegs.

FIG. 2A shows a square-shaped heat sink module 1 that comprises a depression 6 for the acceptance of a component. The heat sink module 1 comprises projections 4 and 4a fashioned as pegs and recesses 5 and 5a implemented as bores that are complementary thereto. Since the projections 4a on the lower edge of the heat sink module 1 have a greater spacing than the projections 4 on the right-hand edge of the heat sink module 1, only a single orientation is possible when joining a plurality of the identical heat sink modules 1 together. A second heat sink module 1' that is implemented according to FIG. 2 could only have its left-hand edge attached flush to the right-hand edge of the heat sink module 1, as shown in FIG. 2B, with its bores 5 receiving the pegs 4. A third heat sink module 1" can be plugged into the module 1 with the pegs 4a of the third heat sink module 1" received in the bores 5a of the module 1.

Figure 3A:
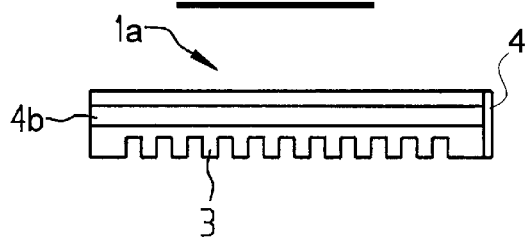
FIG. 3A shows a first side view of an inventive heat sink module that is provided with channels and tongues.

FIG. 3A shows a heat sink module 1a with cooling ribs 3. It comprises a projection 4b, which is illustrated as a tongue that extends parallel to the edge or side of the module 1a.

Figure 3B:
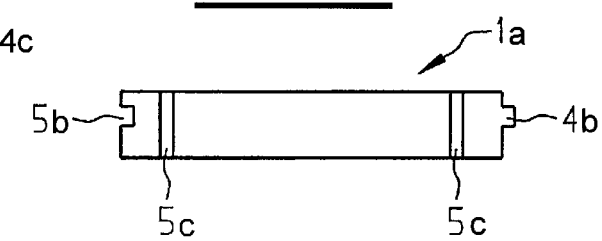
FIG. 3B shows the heat sink module of FIG. 3A in a second side view.
Figure 3C:
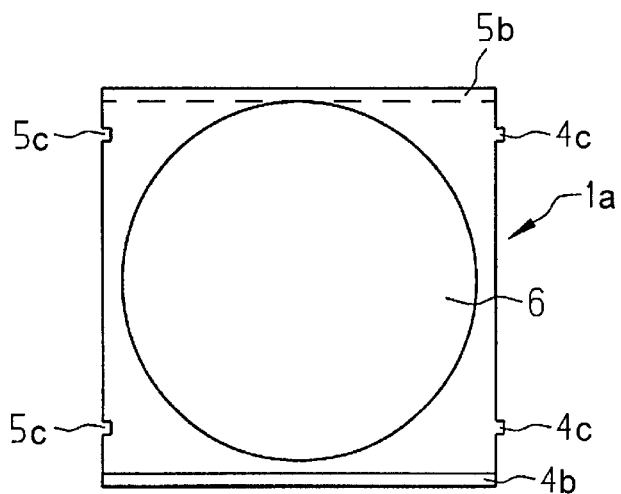
FIG. 3C shows the heat sink module of FIG. 3A in a plan view.

As proceeds from FIG. 3B, the module 1a also comprises a recess 5b at that side or edge lying opposite the projection 4b that is complementary thereto, and the recess 5b is fashioned as a channel or groove. As proceeds from FIG. 3B and from FIG. 3C, the heat sink module 1a also comprises dovetail-shaped projections or tongues 4c on one of the two other opposite sides or edges, which projections proceed transverse relative to the side edges of the plate-like member of the heat sink module 1a and comprises recesses 5c that are complementary with said projections 4c. With the assistance of the projection 4b and recess 5b implemented as a channel and a tongue, the heat sink module 1a can be joined to another heat sink module by pushing these together in the plane. As shown in FIGS. 3D and 3E, the projections are dovetailed springs or leaf springs 4d and 4e and the recesses are dovetailed grooves or channels 5d and 5e. The dovetail-like fashioning of the springs 4d prevents the two heat sink modules from being simply pulled apart and thus contributes to the stabilization of the arrangement formed by the two heat sink modules (see FIG. 3E). The projections 4c or recesses 5c proceeding perpendicular to the edges of the ground plane of the heat sink module 1a thus enable the heat sink module 1a to be joined with another heat sink module 1a by being moved perpendicular to the plane of the heat sink module, whereby the dovetail-like fashioning of the projections 4e or recesses 5e prevents the heat sink modules from being simply pulled apart in the plane.

Figure 4:
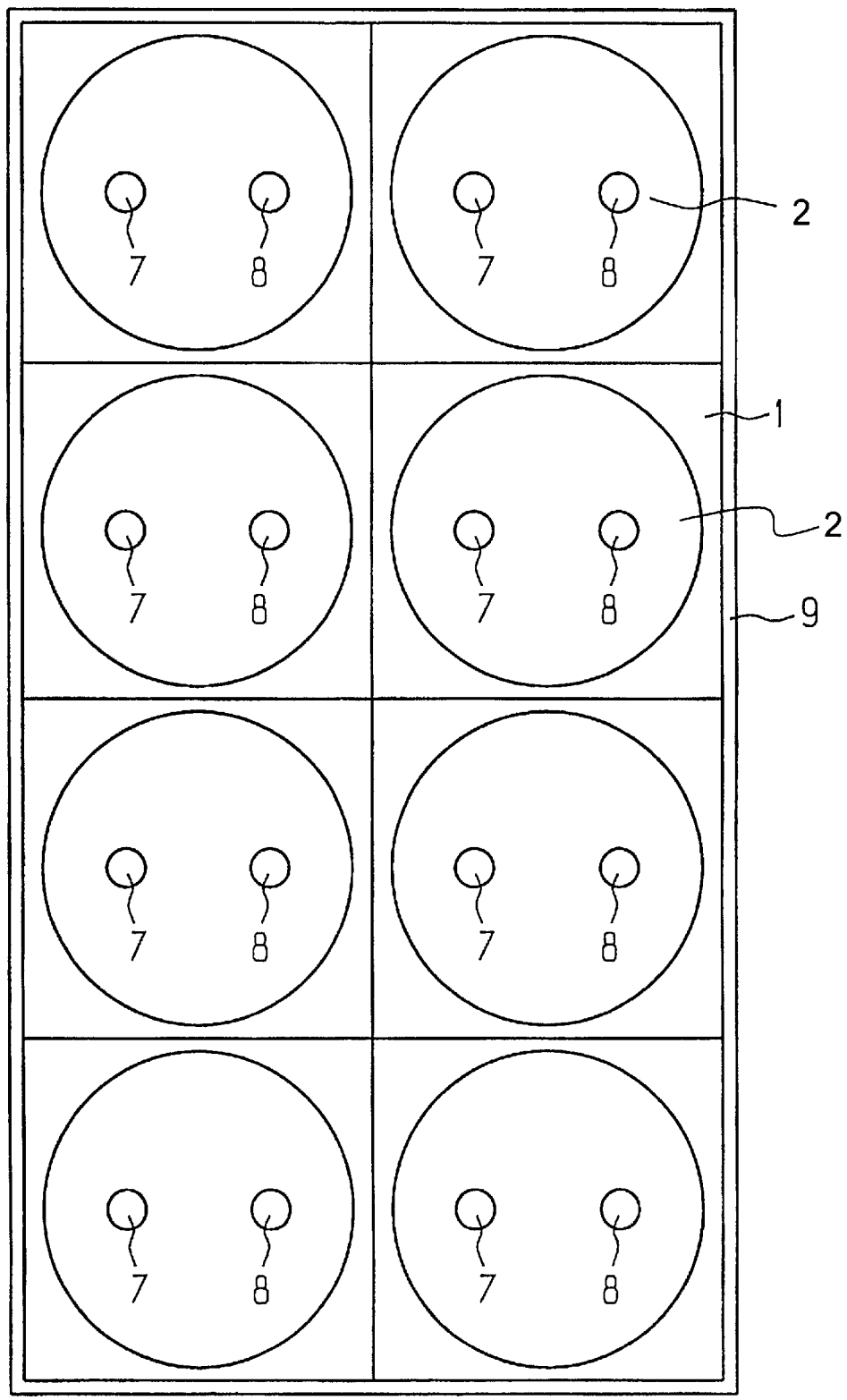
FIG. 4 shows an inventive arrangement of the heat sink modules in a plan view.

FIG. 4 shows an arrangement of a plurality of the identical heat sink modules 1. A component 2 is arranged on each heat sink module 1, whereby the components 2 are identical to one another. The components 2 respectively comprise a first terminal element 7 and a second terminal element 8 that are conducted upwardly out of the component at that side of the component 2 facing away from the heat sink module 1. Due to the projections and recesses (not shown in FIG. 4) of the heat sink modules 1 that prescribe an unambiguous orientation, the components 2 can have their terminal elements 7, 8 unambiguously oriented relative to the heat sink modules 1. The inventive implementation of the surface structures of the heat sink modules 1 leads thereto that a heat sink module 1 can be joined to another heat sink module 1 in only a single orientation, as a result whereof the identical orientation of the components 2 on the heat sink modules 1 is preserved. As a result thereof, it is possible to interconnect a plurality of components 2 to form component banks, whereby the terminal elements 7, 8 are all identically oriented, and this greatly simplifies the electrical contacting of the components 2. The heat sink modules 1 interconnected to form an arrangement of the heat sink modules are held together by a frame 9 that enhances the mechanical strength of the arrangement of the heat sink modules and prevents the individual heat sink modules 1 from coming apart.

The invention is not limited to the embodiments shown by way of example but is defined by the scope of all modifications as reasonably and properly come within the scope of our contributions to the art.

We claim:

1. A heat sink module comprising a plate-like member with a polygonal shape having a first pair of opposite edges and a second pair of opposite edges, said member having one surface on which a heat generating component can be secured, a second surface opposite the one surface having cooling ribs, said pairs of opposite edges of the member comprising complementary surface structures with whose assistance a plurality of identical heat sink modules can be joined together in one plane, the surface structures being fashioned so that the heat sink modules can be joined to another heat sink module in two orthogonal directions.

2. A heat sink module according to claim 1, wherein the member has a square shape.

3. A heat sink module according to claim 1, wherein the one surface for the heat generating component has a depression for accepting the component.

4. A heat sink module according to claim 1, wherein the surface structure for the first pair is fashioned differently than the surface structure for the second pair.

5. A heat sink module according to claim 4, wherein the surface structure for the first pair is a tongue and groove extending parallel to a plane of the one surface and the surface structure for the second pair is a tongue and groove extending perpendicular to said plane.

6. A heat sink module according to claim 4, wherein the surface structures are formed by projections and recesses.

7. A heat sink module according to claim 6, wherein the recesses are blind holes proceeding in a plane of the module and the projections are round pegs.

8. A heat sink module according to claim 6, wherein the recesses are channels and the projections are tongues having a form complementary to the form of the respective channels.

9. A heat sink module according to claim 6, wherein the projections are dovetail-shaped springs.

10. A heat sink module according to claim 7, wherein the spacing between the round pegs for the first pair is different than a spacing between the round pegs for the second pair.

11. A heat sink module according to claim 9, wherein the dovetail-shaped spring of the first pair extend parallel to a plane of the one surface of the module and the dovetail-shaped spring of the second pair extends perpendicular to the plane.

12. An arrangement comprising the heat sink module according to claim 3 and a heat-generating component being glued in said depression.

13. An arrangement comprising the heat sink module according to claim 1 and a heat-generating component, said component being an electrical capacitor.

14. An arrangement of heat sink modules, each module having two pairs of opposite edges and one surface on which a component having terminal elements is secured, each heat sink module having an opposite second surface provided with cooling ribs, the edges of each module having surface structures fashioned so that the modules can be joined together, the surface structure of one of the two pairs being different from the surface structure of the other of the two pairs so that the modules can be joined together along two orthogonal directions in only one orientation forming a continuous plate, with terminal elements of each component being aligned.

15. An arrangement according to claim 1, wherein the heat sink modules are held together by a frame engaging the outer edges of the arrangement.

* * * * *